United States Patent
Chen (10) Patent No.: US 8,793,104 B2
(45) Date of Patent: Jul. 29, 2014

(54) FLAT PANEL DISPLAY DEVICE

(76) Inventor: Kuan Wen Chen, Taipei (TW)

( * ) Notice: Subject to any disclaimer, the term of this patent is extended or adjusted under 35 U.S.C. 154(b) by 724 days.

(21) Appl. No.: 12/854,975

(22) Filed: Aug. 12, 2010

(65) Prior Publication Data
US 2012/0041721 A1     Feb. 16, 2012

(51) Int. Cl.
*G06F 17/50*     (2006.01)

(52) U.S. Cl.
USPC .............................................................. 703/1

(58) Field of Classification Search
USPC .............................................................. 703/1
See application file for complete search history.

(56) References Cited

U.S. PATENT DOCUMENTS

| | | | | |
|---|---|---|---|---|
| 5,857,770 A | * | 1/1999 | Fohl et al. | 362/511 |
| 2004/0196665 A1 | | 10/2004 | Travis | 362/616 |
| 2006/0132423 A1 | * | 6/2006 | Travis | 345/102 |
| 2011/0044579 A1 | | 2/2011 | Bathiche et al. | |

FOREIGN PATENT DOCUMENTS

| | | | | |
|---|---|---|---|---|
| GB | WO-01/720037 | * | 9/2001 | H04N 5/74 |
| GB | WO 2006/054056 | * | 5/2006 | |
| GB | WO 2006/082444 | * | 8/2006 | |
| GB | 1358765 | * | 12/2006 | H04N 9/31 |
| WO | WO 2012/006952 | | 1/2012 | |

OTHER PUBLICATIONS

Lee et al.; Flat-panel autostereoscopic 3D display; IET Optoelectron; 2008, 2, (1), pp. 24-28.*
Chen, C-H and Travis, ARL (1999) New projection lens for three-dimensional displays. Electronics Letters, 35. pp. 2137-2138. ISSN 0013-5194.*
Lee et al.; Flat-panel backlight for view-sequential 3D display; IEE Proc.-Optoelectron., vol. 151, No. 6, Dec. 2004; pp. 486-489.*
Travis et al.; Flat Projection for 3-D; Proceedings of the IEEE, vol. 94, No. 3, Mar. 2006; pp. 539-549.*
Lee et al.; Flat-panel autostereoscopic 3D display; IET Optoelectron; 2008, 2, (1), pp. 24-28; pp. 24-28.*
Kong; Angle relations inside a bent waveguide for a wedge display; IET Optoelectron., Feb. 2009, vol. 3, Iss. 1, pp. 54-60.*
Chen (inventor) et al.; Parabolic Transition Region Curve for a Wedge Projection Display, in Emerging Liquid Crystal Technologies IV (Proceedings volume); ISBN: 9780819474780; Mar. 2009; pp. 1-11.*
Tan et al. (including inventor): A new type holographic display based on a wedge-shaped waveguide and its keystone predistortion; in Emerging Liquid Crystal Technologies IV (Proceedings volume); ISBN: 9780819474780; Mar. 2009; pp. 1-8.*
PCT/US2010/046129; PCT of related application; assignee Microsoft; Mar. 2011; pp. 1-9.*

\* cited by examiner

*Primary Examiner* — Hugh Jones
(74) *Attorney, Agent, or Firm* — Bacon & Thomas, PLLC (57) ABSTRACT

The invention discloses a method to design the optical profile of a flat panel display device comprising a first waveguide, a transition waveguide and a waveguide/display, wherein the waveguide/display has a display surface and a substantially wedged shape, comprising the steps of: determining the optical profile of the first waveguide and the transition waveguide; selecting major light paths/angles, calculating to obtain the surface profile of the sections in the waveguide/display corresponding to the respectively selected light paths/angles, to compensate the distortions in the displayed image.

29 Claims, 10 Drawing Sheets

MatLab Function: wedge_generation_main.m

```
clear;
syms x z t;
load parameters_data.mat
load shortened_curve_data.mat angleRay=angleStart;
angleIncrement=0.005;
angleStop=1.5;
constrant=1;
[xfinal,yfinal,sur_z,sur_t,n,bounces_final,b_final,angleSurf,bounces_slab,bounces_curve,bounces_wed
ge,angle_input,angle_exit_curve,angle_exit_wedge,angle_exit_complete,distance_travel]=surface_loop
(angleRay,angleCrit,constrant,angleStop,angleIncrement);

savefile='profile_data.mat';
save(savefile,'t0','Lslab','angleCrit','equCurve','zEndCurve','angleSurf','sur_t','sur_z','n');

plot(hori,verti,xfinal,yfinal,sur_z,sur_t);
xlabel('Length (mm)');
ylabel('Thickness (mm)');
```

FLAT PANEL DISPLAY DEVICE

FIELD OF THE INVENTION

The present invention relates to a flat type display device, especially to a flat panel display device that has a first waveguide, a transition waveguide and a display panel that has substantially the wedge shape. The present invention discloses a novel structure of the flat panel display device and a method to determine the surface profile of the flat panel display device.

BACKGROUNDS OF THE INVENTION

The "wedge-shaped sheet waveguide," also known as the "wedge flat panel display," is a novel projection display technology. A representative wedge flat panel display is disclosed in WO 01/72037 "Waveguide Display" by Dr. Adrian Robert Leigh Travis. The wedge flat panel is essentially a wedge shaped panel, allowing the image projected by a projector magnified within the panel. In such a display system, the image source enters the display panel from the bottom or from the edge of the screen rather than from the rear of the display screen, whereby greatly reduces the depth of the device.

The most recent type of the wedge flat panel display consists of a planar waveguide and a wedge waveguide, with a carefully designed architecture that enables the projected image pixels to align in a correct order when displayed and the optical path to fold within the waveguide, to magnify the image within the thin space of the planar and the wedge waveguides.

The wedge shaped panel also benefits from the low material cost as the panel can be made from conventional acrylic materials, such as PMMA. The wedge shaped panel is a bi-directional light path, which means that the panel can be used as the lens for a camera to collect the incoming lights/images.

The wedge flat panel display provides the benefits of low-cost and space saving ability. Its drawback, however, is the image band gaps, i.e. the "dark zones" that are easily found in the displayed images. The dark zones, which separate the image into bands, are unacceptable if the wedge waveguide to be used for display purposes. A technique that eliminates the image band gap is to place a diffusive screen at a correct distance gap away from the waveguide. However, this image band gap elimination technique causes distortions when it is used for a thick wedge waveguide device or a device with pixels much smaller than the thickness of the wedge waveguide.

A technology to remove the image band gap is called the "gapless profile wedge." This technology is disclosed in the U.S. Pat. No. 7,410,286, "Flat-panel display using tapered waveguide," to Dr. Travis. The basic idea of the gapless profile waveguide panel is to calculate a wedge waveguide surface profile with the final output image not separated by the dark zones. This is done by dividing the surface of the wedge waveguide in to sections orthogonal to the image ray paths and calculating the critical thickness and the length of each section, allowing the image rays to exit the panel via the critical angle after the same number of double bounces within the panel. In the gapless profile wedge waveguide/display, a wedge display and a flat slab waveguide are provided.

The main problem of the gapless profile algorithm is the overlapping of the image occurred in the display panel, as known as the overlapping distortion. This is created by the sharp angle transition in the upper surface from the flat slab waveguide region to the tilt wedge waveguide region (known as the "kink") that makes those image rays intercepting at the upper surface in the areas just before and after the kink and overlapping each other. As a consequence, the final output image is damaged by the overlapping distortion.

Another problem with the gapless profile algorithm is that the surface profile calculated by the gapless profile algorithm assumes all the image rays exit the panel after the same number of bounces, when the thickness of the waveguide is infinitesimally thin. In the case of a display panel with a finite thickness, the gapless profile algorithm would cause distortions to the images as the rays exit the panel after different number of bounces.

The insertion of a curved waveguide called the "transition waveguide" between the slab waveguide and the wedge waveguide was proposed by A. Travis et al. as a possible solution to the image overlapping distortion, as described above, in their US published patent application No. 2004/0095560. The curved waveguide replaces the sudden angle change (or the kink) at the upper waveguide surface by a surface with a smooth curve, such that the image rays do not overlap each other.

To design the transition waveguide for a wedge display panel, it is difficult to find a rule in the determination of the optimal length and the shape of the transition waveguide curve. The shape and the length of the transition waveguide have significant influence on the image rays' propagation within the wedge panel. However, it is still not possible to identify the optimal shape and length of the transition waveguide curve, giving all the known parameters regarding the image rays, the slab waveguide and the edge waveguide. It is also found that inserting a smooth transition waveguide without modifying the wedge waveguide surface profile would cause the rays to undergo a different number of bounces before they exit the panel.

It is therefore necessary to provide a novel structure of the flat panel display device that uses a waveguide/display panel with substantially the wedged shape.

It is also necessary to provide a flat panel display device that can eliminate the image band gap in the displayed image.

It is also necessary to provide a flat panel display device that is low cost and easy to fabricate.

It is also necessary to provide a flat panel display device that may enhance the quality of the image displayed.

It is also necessary to provide a flat panel display device with a friendly interface to other image processing or optical components.

It is also necessary to provide a flat panel display device wherein the geometric shape of the display panel is not limited to any particular shape.

It is also necessary to provide a flat panel display device with the geometric shape not limited to any particular shape.

It is also necessary to provide a new approach in designing the shape and optical profile of the flat panel display device.

It is also necessary to provide a new method to simplify the design in the shape and optical profile of the flat panel display device.

It is also necessary to provide a method for the design in the structure and optical profile of a flat panel display device with enhanced quality in the image displayed.

It is also necessary to provide a method for the design in the structure and optical profile of a flat panel display device with a friendly interface to other image processing or optical components.

It is also necessary to provide a method for the design in the structure and optical profile of a flat panel display device wherein the geometric shape of the display panel is not limited to any particular shape.

It is also necessary to provide a method for the design in the structure and optical profile of a flat panel display device with the geometric shape not limited to any particular shape.

OBJECTIVES OF THE INVENTION

One objective of this invention is to provide a novel structure of the flat panel display device that uses a waveguide/display panel with substantially the wedged shape.

Another objective of this invention is to provide a flat panel display device that can eliminate the image band gap in the displayed image.

Another objective of this invention is to provide a flat panel display device that is low cost and easy to fabricate.

A further objective of this invention is to provide a flat panel display device that may enhance the quality of the image displayed.

A further objective of this invention is to provide a flat panel display device with a friendly interface to other image processing or optical components.

Another objective of this invention is to provide a flat panel display device wherein the geometric shape of the display panel is not limited to any particular shape.

Another objective of this invention is to provide a flat panel display device with the geometric shape not limited to any particular shape.

Another objective of this invention is to provide a new approach in designing the shape and optical profile of the flat panel display device.

Another objective of this invention is to provide a new method to simplify the design in the shape and optical profile of the flat panel display device.

A further objective of this invention is to provide a method for the design in the structure and optical profile of a flat panel display device with enhanced quality in the image displayed.

A further objective of this invention is to provide a method for the design in the structure and optical profile of a flat panel display device with a friendly interface to other image processing or optical components.

Another objective of this invention is to provide a method to design the structure and optical profile of a flat panel display device wherein the geometric shape of the display panel is not limited to any particular shape.

Another objective of this invention is to provide a method to design the structure and optical profile of a flat panel display device with the geometric shape not limited to any particular shape.

SUMMARY OF THE INVENTION

According to the present invention, a novel structure of the flat panel display device is provided. The invented flat panel display device comprises in order a first waveguide, a transition waveguide and a second waveguide and display panel, wherein the second waveguide and display panel has a display surface and a substantially edged shape and wherein the surface profile of the second waveguide and display panel compensates the distortions in the displayed image generated by the light path in the first waveguide and the transition waveguide. In one embodiment of the present invention, the transition waveguide has a surface profile that restricts the light rays from the first waveguide to bounce only once in the transition waveguide. In an embodiment, the display surface of the second waveguide and display panel includes a plurality of sections in the display surface, wherein the surface profile of the first section of the display surface is determined by calculating the optical path of a light source positioned at the entrance side of the first waveguide with a first incident angle passing through the first waveguide and the transition waveguide to produce a selected exit angle and the surface profile of the nth (n is a natural number equal or greater than 2) section of the display surface is determined by calculating the optical path of a light source positioned at the entrance side of the first waveguide with an nth incident angle passing through the first waveguide, the transition waveguide and the first to n−1th sections of the second waveguide and display panel to produce said exit angle.

The present invention also discloses a method to determine the structure and optical profile of a flat panel display device comprising in order a first waveguide, a transition waveguide and a second waveguide and display panel, wherein the second waveguide and display panel has a display surface and a substantially edged shape. The invented method comprises the steps of: determining the optical profile of the first waveguide and the transition waveguide; selecting major light paths/angles, calculating to obtain the surface profile of the sections in the second waveguide and display panel corresponding to the respectively selected light paths/angles, to compensate the distortions in the displayed image generated by the selected light paths in the first waveguide. In the embodiment of the present invention, the calculation in the surface profile of the second waveguide and display panel comprising the steps of: selecting a first light path/angle to calculate and obtain the surface profile of a first section in the second waveguide and display panel that compensates the distortion in the displayed image generated by the first light path/angle in the first waveguide and the transition waveguide: selecting an nth (n is a natural number equal to or greater than 2) light path/angle to calculate and obtain the surface profile of the nth section in the second waveguide and display panel that compensates the distortion in the displayed image generated by the nth light path/angle in the first waveguide, the transition waveguide and the first to n−1th section of the second waveguide and display panel; and repeating the previous step until all the selected light paths/angles are calculated.

In some embodiments of the invented method, the transition waveguide has a surface profile that restricts the light rays from the first waveguide to bounce only once in the transition waveguide. In another embodiment, the determination in the surface profile of the second waveguide and display panel comprises the steps of: calculating to obtain the surface profile of a first section of its display surface according to the optical path of a light source positioned at the entrance side of the first waveguide with a first incident angle passing through the first waveguide and the transition waveguide to produce a selected exit angle and calculating to obtain the surface profile of the nth (n is a natural number equal or greater than 2) section of the display surface according the optical path of a light source positioned at the entrance side of the first waveguide with an nth incident angle passing through the first waveguide, the transition waveguide and the first to n−1th sections of the second waveguide and display panel to produce said exit angle.

To be more specific, the present invention discloses a new approach in the determination of the surface profile of a flat panel display device comprising a first waveguide, a transition waveguide and a second waveguide and display panel. When determining the profile of the flat panel display device, the structure of the first waveguide and the transition waveguide is decided, followed by deciding the profile of the second waveguide and display panel. An iterative approach is used to determine the shape of the display surface of the second waveguide and display panel section by section. The invented method in the determination of the profile of the flat panel display device comprises the following steps:

The structure/optical profile of the first waveguide and the transition waveguide is first determined. In determining the structure/optical profile of the transition waveguide, the transition waveguide is preferably designed to have a shortest possible curve length, counting from the junction of the first waveguide and the transition waveguide to the junction of the transition waveguide and the second waveguide and display panel, while maintaining the smoothest possible curve, i.e. the gradual variation in the curvature, of the surface of the transition waveguide that connects the surface of the first waveguide and the second waveguide and display panel.

Thereafter, the optical paths of the image rays in the first waveguide and the transition waveguide are calculated, based on the profile of the first waveguide and the transition waveguide and the projection angle of the image rays, using for example the basic trigonometric relationships thereof.

In the following step, the desired exit angle or a range of the desired exit angle of the image rays $\theta_{exit}$ is decided. Select a first incident light angle to determine the surface profile of the first section of the second waveguide and display panel most adjacent to the transition waveguide, using the profile information of the first waveguide and the transition waveguide, the exit angle and the first incident light angle.

In the following step, a second incident light angle is selected to determine the surface profile of the second section of the second waveguide and display panel, following the first section. In selecting the second incident angle, the second incident angle is preferably slight greater (shallower) than the first incident angle. This step is repeated until the incident light angle reaches or is greater than a threshold, preferably reaches its shallowest possible projection angle.

These and other objectives and advantages of the present invention may be clearly understood from the detailed description by referring to the following drawings.

BRIEF DESCRIPTION OF THE DRAWINGS

FIGS. 1a-1e illustrate the steps in the determination of the surface profile of the flat panel display device of the present invention, wherein

DETAILED DESCRIPTION OF THE INVENTION

The present invention discloses a novel structure of the flat penal display device comprising a first waveguide, a transition waveguide and a second waveguide and display panel. The flat penal display device is especially suited in displaying images projected by an image projector. The incident image rays enter the invented display device from the first waveguide and are expanded. The expanded image rays then enter the second waveguide and display panel through the transition waveguide and exit the second waveguide and display panel, whereby the pixels of the projected image are displayed at the positions where their rays exit the second waveguide and display panel. According to the present invention, the structure and profile of the first waveguide and the transition waveguide are first determined. The surface profile of the second waveguide and display is then determined section by section beginning from the junction of the transition waveguide and the second waveguide and display panel.

FIGS. 1a to 1e illustrates the steps in the determination of the surface profile of the flat panel display device of the present invention. As shown in the FIG. 1e, the completed flat panel display device includes a first waveguide 10, a transition waveguide 20 and a second waveguide and display panel 30.

Figure 1A:
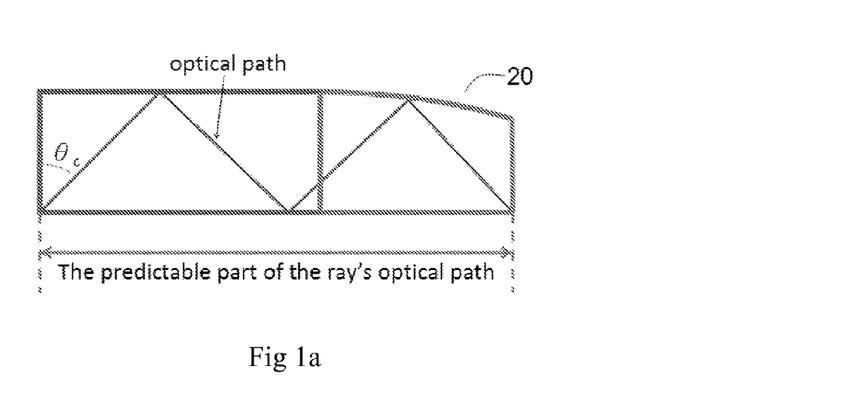
FIG. 1a shows the first waveguide and the transition waveguide and a light path with the incident angle of θc.

FIGS. 1a-1e further show that the surface profile of the flat panel display device of this invention is determined in the following steps:

At first, the structure/optical profile of the first waveguide 10 and the transition waveguide 20 is first determined. A first incident angle of the image rays is selected. The optical path of the image rays with the first incident angle in the first waveguide 10 and the transition waveguide 20 is calculated, based on the optical profile of the first waveguide 10 and the transition waveguide 20 and the first incident angle of the image rays. FIG. 1a shows the first waveguide 10 and the transition waveguide 20 and a light path with the incident angle of θc.

Figure 1B:
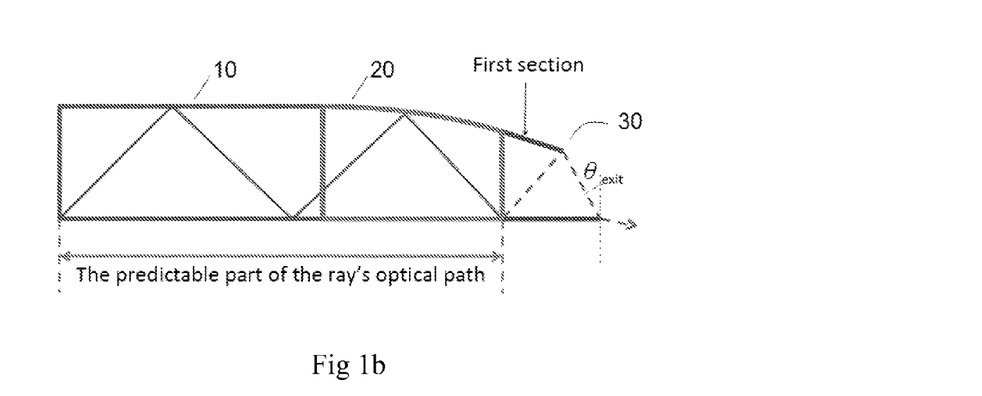
FIG. 1b shows the light path with the first incident angle and the first wedge surface, i.e. the surface of the first section of the second waveguide and display panel.

In the following, the desired exit angle of the image rays $\theta_{exit}$ is decided. Determine the surface profile of the first section of the second waveguide and display panel 30 most adjacent to the transition waveguide, using the profile information of the first waveguide 10 and the transition waveguide 20, the desired exit angle and the first incident light angle. FIG. 1b shows the light path with the first incident angle and the first wedge surface, i.e. the surface of the first section of the second waveguide and display panel 30.

Figure 1C:
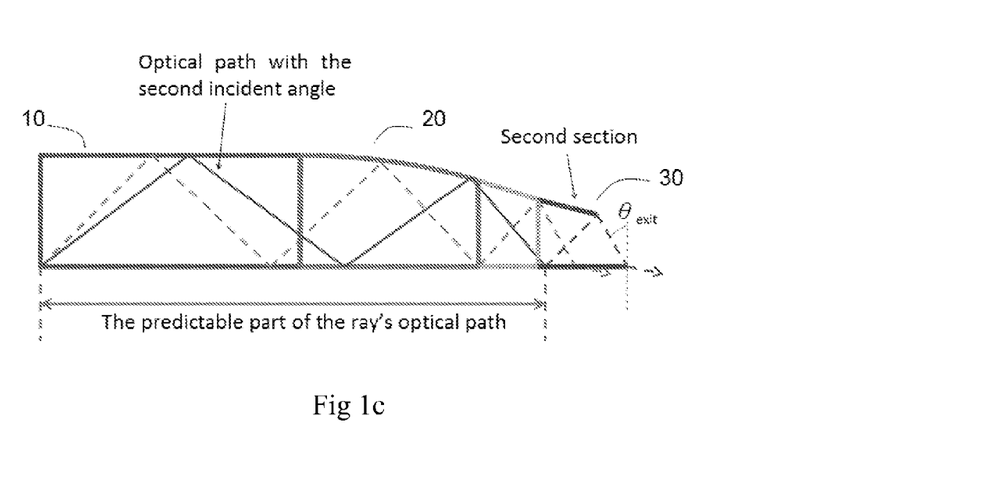
FIG. 1c shows the light path with the second incident angle and the second wedge surface, i.e. the surface of the second section of the second waveguide and display panel that follows the first section.

In the following step, a second incident light angle is selected to determine the surface profile of the second section of the second waveguide and display panel 30, following the first section. In selecting the second incident angle, the second incident angle is preferably slight greater (shallower) than the first incident angle. FIG. 1c shows the light path with the second incident angle and the second wedge surface, i.e. the surface of the second section of the second waveguide and display panel 30 that follows the first section.

Figure 1D:
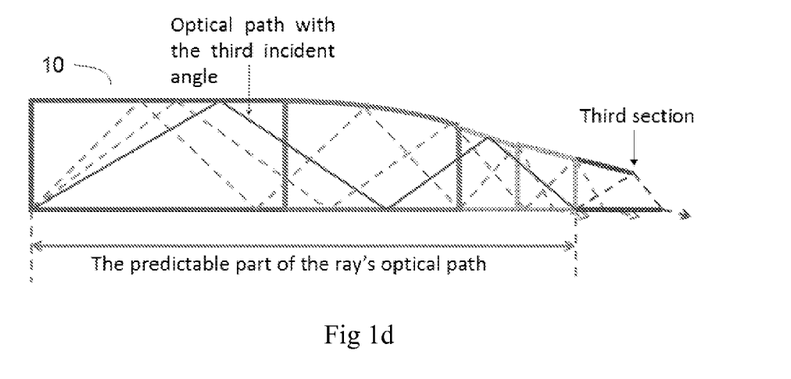
FIG. 1d shows the light path with the third incident angle and the surface of the third section of the second waveguide and display panel that follows the second section and FIG. 1e shows the flat panel display device so obtained.

Thereafter, a third incident angle is selected and the surface profile of the third section in the second waveguide and display panel 30 is determined. FIG. 1d shows the light path with the third incident angle and the surface of the third section of the second waveguide and display panel 30 that follows the second section.

Figure 1E:
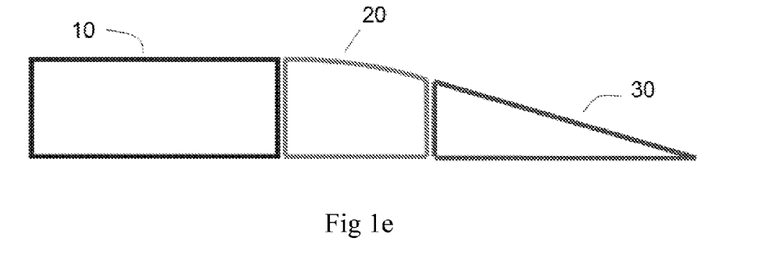

The above steps are repeated until the incident light angle reaches or is greater than a threshold, whereby all the surface profile of the second waveguide and display panel 30 is obtained. FIG. 1e shows the flat panel display device so obtained.

Figure 2:
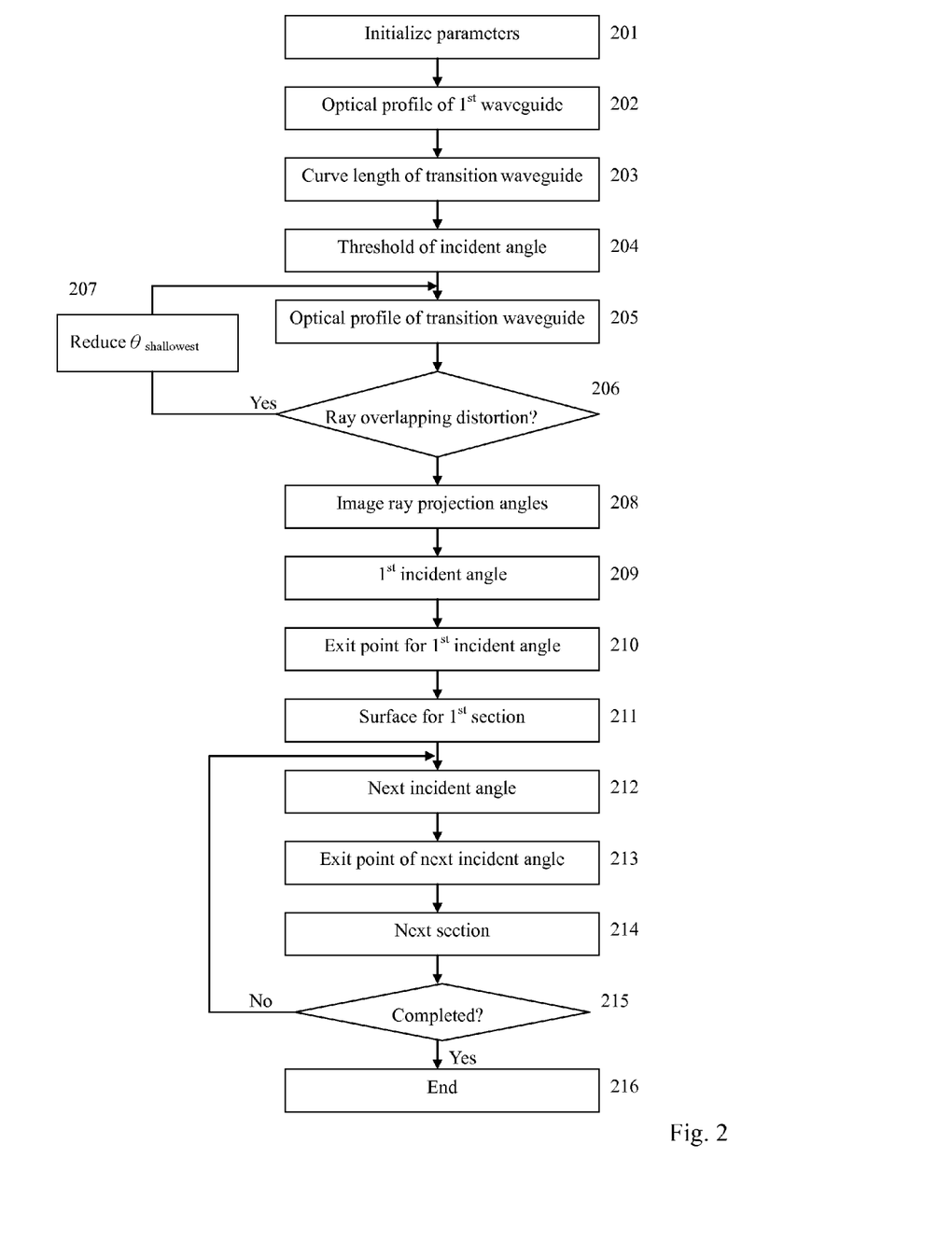
FIG. 2 is a general flowchart of the method for determining the shape profile of the flat panel display device of this invention.

FIG. 2 is the flowchart of the method for determining the optical profile of the flat panel display device of this invention. In the following, details of the steps in the determination of the optical profile of the invented flat panel display will be given. As shown in the figure, at step 201, the initial parameters that define the optical profile of the first waveguide 10 are determined. The parameters needed in this step may include the total number of bounces of the image rays in the display device, the fan out angle of the projector and the thickness of the first waveguide. As may be understood, the first waveguide 10 functions as the fan out waveguide region of the projected image. These parameters are determined by the designer of the flat panel display device according to the needs in the application. In step 202, the structure/optical profile of the first waveguide 10 is calculated. In this step, it may be necessary to determine the structure of an entrance prism (not shown) as well, as the entrance prism is useful in redirect the optical paths of the image rays. At 203 the curve length of the transition waveguide 20, counting from the junction of the first waveguide 10 and the transition waveguide 20 to the junction of the transition waveguide 20 and the second waveguide and display panel 30, is determined. In this step, the curve length of the transition waveguide 20 is preferably the shortest possible, while maintaining the smoothest possible curve, i.e. the gradual variation in the curvature, of the surface of the transition waveguide 20 that connects the surface of the first waveguide 10 and the second waveguide and display panel 30. This, however, is not any technical requirement, as the curve length of the transition waveguide 20 may be freely determined by the designers as they wish.

From the discussion in the prior art, it is known that inserting a transition waveguide into an established wedge display panel structure will change in the whole optical profile of the wedge display panel system and the optical paths of the image rays. Although it is not intended to limit this invention by any particular theory, in the present invention the transition waveguide is designed to be short enough, whereby no image rays undergo more than one bounce within the transition waveguide. By doing so, it is possible to prevent the image rays from undergoing a different number of bounces before they exit the display panel. A transition waveguide with a substantial length, however, is nevertheless needed to provide the smooth angular transition required for a flat panel display device that has a pre-determined wedge structure and the curve length of the transition waveguide must be long enough to ensure a smooth curvature in the surface and to match the surface angles of the first waveguide and the second waveguide and display panel. In the present invention, the curve length is determined as short as possible, while maintaining the smoothness of the curved surface to an acceptable level, and the surface profile of the second waveguide and display panel is so determined that the changes in optical path introduced by inserting the transition waveguide are compensated.

At 204 the limitation of the incident angle of the image rays is determined. In this step, the limitation may be the incident angle of the shallowest ray among the image rays, $\theta_{shallowest}$. Again, this is not any technical limitation, as an experienced designer may determine the limitation to ensure the optical quality of the displayed image according to his/her experiences or according to experiments. Also, in the followings, a step to calibrate or modify the limitation is provided.

At step 205 the structure/optical profile of the transition waveguide 20 is determined. In this step the designer may first determine the surface of the transition waveguide 20 to be circular or a parabolic curve, or any other applicable shape. Again, the shape of the transition surface is not critical in the present invention; it simply influences the complexity in the calculation in the optical profile of the second waveguide and display panel 30. The curvature of the transition waveguide 20 is accordingly calculated based on the known parameters give/obtained above. At step 206 the smoothness of the transition curve is inspected by using a ray tracing software. The ray tracing software maybe any commercially available tool. In this step, it is preferably to inspect if the image rays with $\theta_{shallowest}$ would suffer the overlapping distortion as described above. If the result is positive, at step 207 the $\theta_{shallowest}$ is reduced and the process returns to step 205. Otherwise, in the following step 208, a range of image ray projection angles to be covered by the flat panel display device is determined. An experienced designer may determine the scope of production angles needed to be covered. In some embodiments of the present invention, the scope of the projection angles covered by the transition waveguide at the particular curve length and curvature is selected. In other embodiments, the scope of the projection angles with which the rays undergo the minimum number of bounces, e.g., 1-3 bounces, within the first waveguide is selected.

In the following step 209, a first incident angle of the image rays, θin is selected. There are no particular technical limitations in determining the first incident angle. In the embodiments of the present invention, the first incident angle is set to 0.73 radians, or slightly shallower than the critical angle of the waveguide, while any other incident angle may be used in initialize the process of the present invention. In step 210 trace the optical path of the image rays at the first incident angle in the first waveguide 10 and in the transition waveguide 20 to find an exit point of the incident rays from the second waveguide and display panel 30 that would compensate the distortions in the image represented by the incident rays. In some embodiments of the present invention, the exit point is the point where the incident rays exits the second waveguide and display panel 30 in an acceptable range of angles. In other embodiments, the exit point is the point where the incident rays exits the second waveguide and display panel 30 in an acceptable range of angles, after a limited numbers of bounces in the first waveguide 10 and the transition waveguide 20.

In the following step 211 define a line section or a curve section connecting the downstream end of the transition waveguide 20 and the exit point so obtain, to obtain the surface profile of the first section of the second waveguide and display panel 30. Certain constraint parameters that determine the desired exit angles of the rays and the shape of the second waveguide and display panel 30 may be used in the determination of the surface profile of the first section. In the following step 212, a second incident angle is selected. In selecting the second incident angle, the second incident angle is preferably slightly greater (shallower) than the first incident angle. The difference between the first and the second angles may be decided by the designer. Generally speaking, the scale of the difference influences only the resolution of the variation in the surface profile of the second waveguide and display panel, while a smaller difference means higher resolution but more calculation. In some embodiments of the present invention the difference is set to 0.005 radians. As to whether the difference decrements or increments the incident angle, it is purely up to the decision of the designer. Thereafter, in step 213 trace the optical path of the image rays at the second incident angle in the first waveguide 10, in the transition waveguide 20 and the first section of the second waveguide and display panel 30, to find an exit point of the incident rays from the second waveguide and display panel 30. In step 214 the surface profile of the second section of the second waveguide and display panel 30 is found. Repeat steps 213 and 214 until all the selected incident angles are calculated or the selected incident angle exceeds a limitation/threshold, or until the exit point is very close to the baseline of the second waveguide and display panel 30. While the loop may continue unnecessarily long, in some embodiments, a threshold with an experience value is set to stop the loop. In these embodiments, the threshold may be 1.5 radians if the first incident angle is set to 0.7154 radians. These, of course, are not any technical limitation.

At step 215 the results are checked to see if the full surface profile of the second waveguide and display panel 30 has been obtained. If yes, the process ends at step 216, otherwise, the process returns to step 213.

Embodiment

The surface profile of a prototype panel is calculated using the method to determine the structure and optical profile of a flat panel display device of this invention. An entrance prism with the tilt angle of 45 degrees is used to refract the image light rays from the projector before they enter into the first waveguide. The first waveguide is a slab with the thickness of 20 mm and allowing the rays to undergo the maximum of 21 bounces within the slab. This gives a roughly 1:20 thickness to length ratio in the first waveguide.

Figure 3:
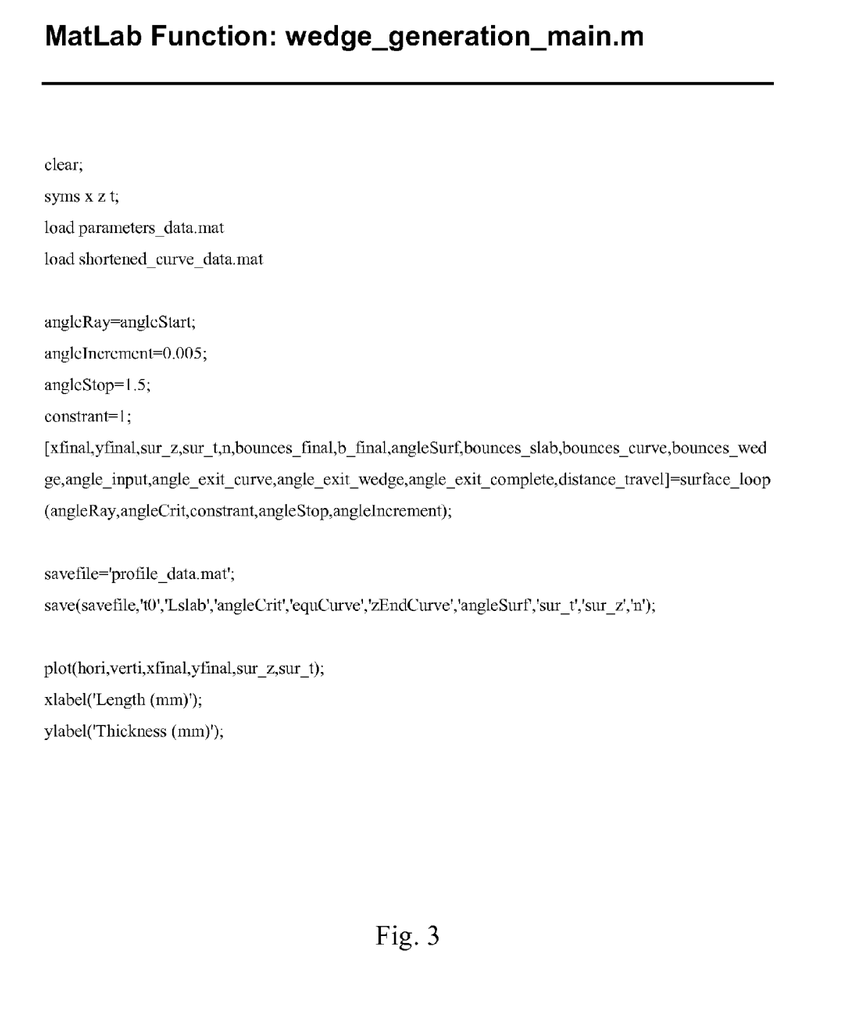
FIG. 3 shows the source codes of the loop to determine the surface profile of the second waveguide and display panel according to one embodiment of this invention.

In designing the surface profile of the transition waveguide, the following parameters are selected:
 Shape of the transition waveguide curve: Circular
 Target Rays Rays undergo more than 7 bounces in the first waveguide
 Curve length of the transition waveguide: 19 (mm)
In designing the surface profile of the second waveguide and display panel, the constraint parameter settings that limit the gradient change of the wedge surfaces include:
 Gradient Constraint: Negative
 Gradient Change Constraint: Yes
 Exit angle limit: 0.73 radian The MatLab function loop as shown in the FIG. 3 "wedge_generation_main.m" is run in a commercially available computer that runs the MetLab software to calculate the surface profile of the second waveguide and display panel. Note that the initial incident angle is set to 0.7154 radians and the stop angle (threshold) is set to 1.5 radians, with an incremental angle of 0.005 radians.

As may be seen from these settings, the surface curve of the transition waveguide is designed to provide an angular transition smooth enough for the rays that have undergone more than 7 bounces in the first waveguide 10. The gradient change constraint is added to ensure that the surface of the second waveguide and display panel cannot be a convex curve. This avoids the problems with a wavy surface at the second waveguide and display panel. The exit angle is limited to an angle shallower than the critical angle to ensure that the rays will not intercept the destined exit surfaces at an angle equal to or smaller than the critical angle. This prevents the rays from undergoing more than the expected number of bounces within the panel.

Figure 4:
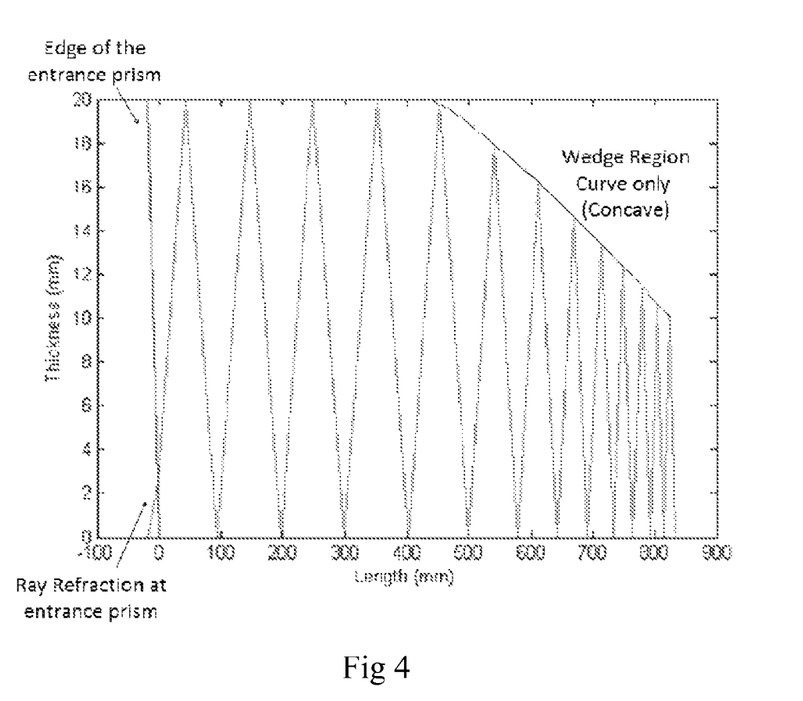
FIG. 4 shows the results of the surface profile obtained in one embodiment of this invention.
Figure 5:
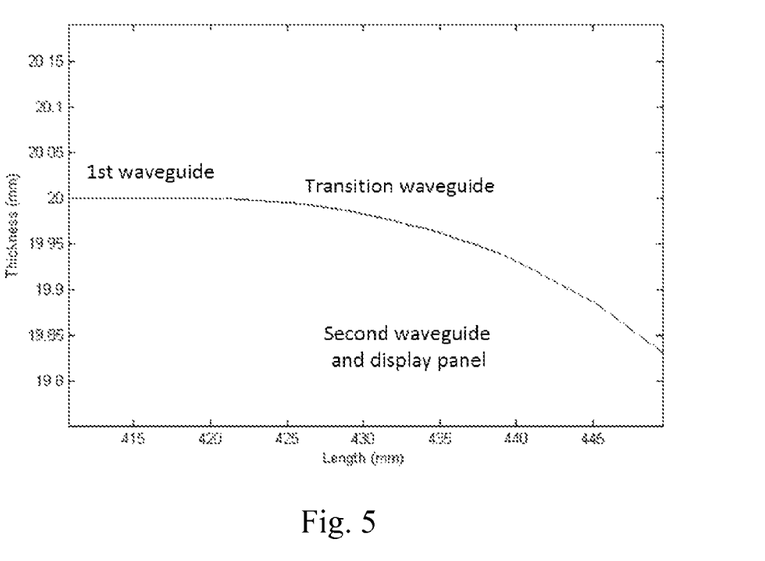
FIG. 5 further shows the detailed surface profile of the flat panel display device of FIG. 4.
Figure 6A:
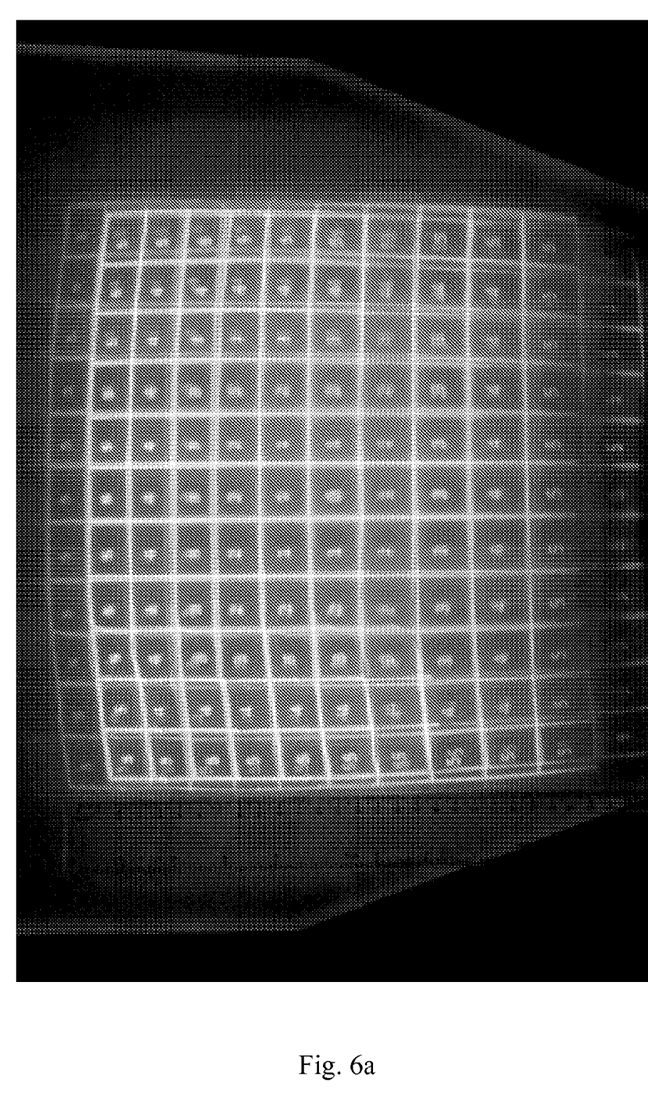
FIGS. 6a-6d show the results of the tests using a picture of gridlines with numbers in the prototype of FIG. 4.
Figure 6B:
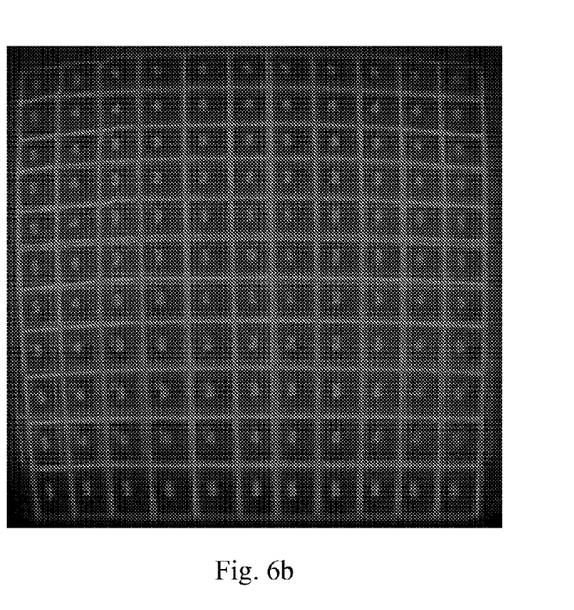
Figure 6C:
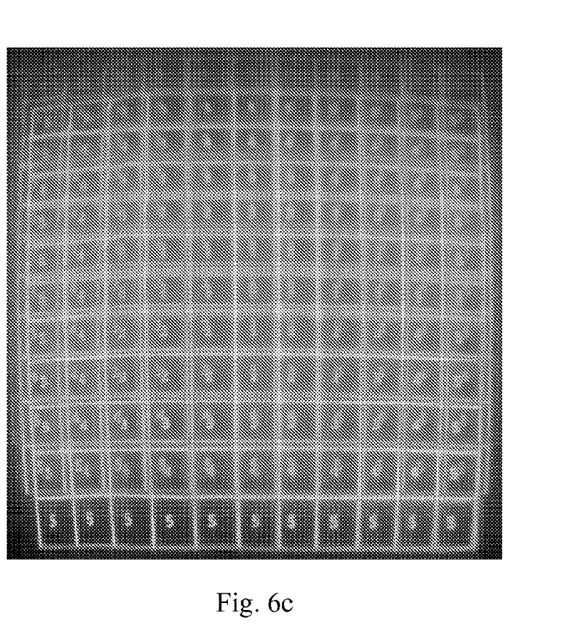
Figure 6D:
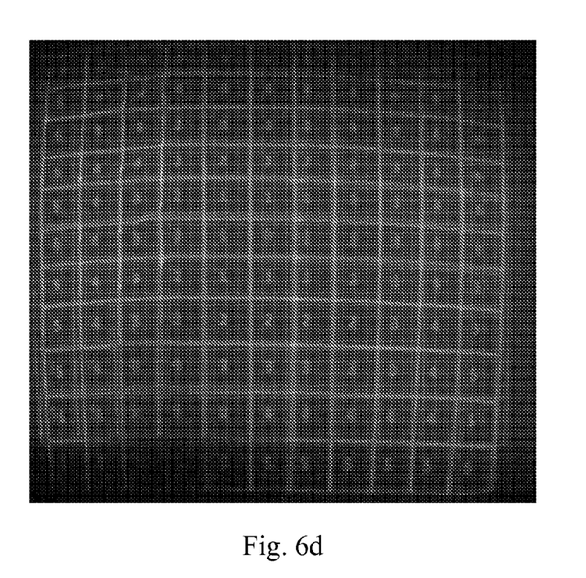

The results of the surface profile so obtained are shown in FIG. 4. FIG. 5 further shows the detailed surface profile of the first waveguide, the transition waveguide and the second transition waveguide and display panel. In these figures, the length and the shape of the transition waveguide curve are not the optimal figures. These parameters are only chosen to demonstrate how a short transition waveguide curve can be designed using the invented algorithm.

The dimensions and other details of the prototype panel are:
 Dimension of the first waveguide (mm): 420×321.45×20
 Length of the prototype panel (mm): 841.3 plus the entrance prism
 Fan out rotation angle: 45 degrees
 Entrance Prism bevel: 45 degrees
 Maximum number of bounces in the first waveguide: 21
 Scope of projection ray angles being covered: approximately 40 degrees (41.2~81.6 degrees)

A prototype of the resulted design is prepared. Simple experiments are carried out in a dark room to verify the effects of the prototype panel. A conventional projector placed at the entrance prism of the prototype panel, to serve as the image source. An experiment is carried out using the picture of gridlines with numbers. The results are shown in FIGS. 6a-6d, wherein the results of the tests for the full spectrum image (6a) and for the red (6b), green (6c) and blue (6d) only images are tested. FIGS. 6a-6d show that a clear output image is achieved with the prototype panel if the chromatic aberration and the image ghosting image problems are removed.

Figure 7A:
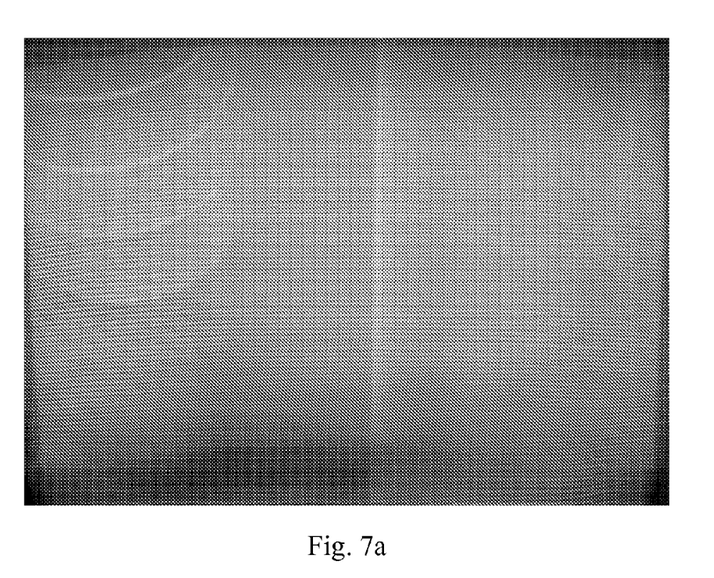
FIGS. 7a-7c show the results of the strip line tests in the prototype of FIG. 4.
Figure 7B:
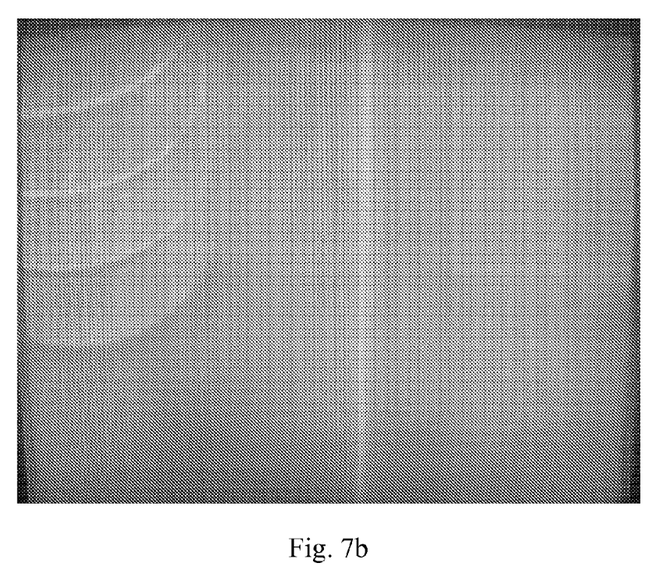
Figure 7C:
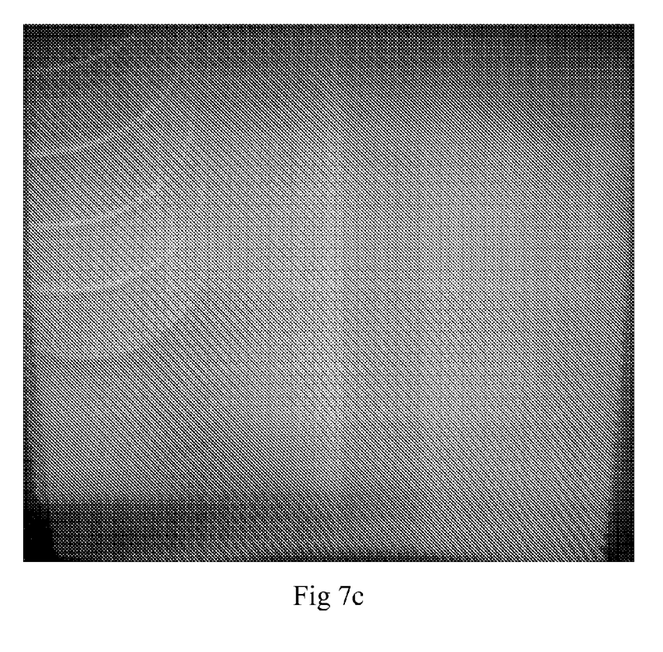

The strip line tests are also carried out. The results are shown in FIGS. 7a-7c. The strips tested are four pixels wide. Clear keystone distortion is observed from the picture of FIG. 7a, where horizontal strips are slightly bent towards the bottom of the panel. The key stone distortion and the chromatic aberration can be solved with the conventional image processing techniques and chromatic aberration correction optics. Again, clear ghost images and the distortions caused by the manufacturing faults were found from the pictures shown in FIGS. 7a, 7b and 7c. The zigzagged distortions shown in FIG. 7c are caused by the manufacturing faults as the zigzagged diagonal lines are only found at the regions with clear machining. The signatures of the image overlapping distortion are not found in the image shown in FIG. 7c except in regions with clear machining marks.

EFFECTS OF THE INVENTION

The experimental results proved that it is possible to design a wedge display panel with a very short transition waveguide and good thickness to diagonal ratio using the invented method. In this invention, the surface profile of the second waveguide and display panel is calculated iteratively according to the optical paths of the rays within the first waveguide and the transition waveguide. Certain constraint parameters are introduced to allow a designer to control the exit positions and the exit angles of the image rays.

The prototype panel successfully demonstrated that no image overlapping distortion is found in the prototype panel even though the transition waveguide region used is very short.

Figure 8:
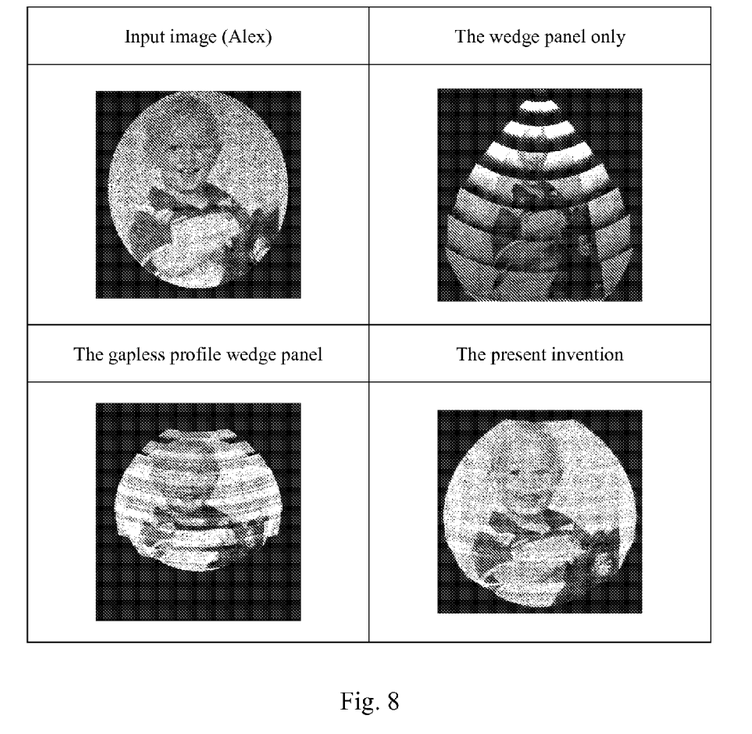
FIG. 8 shows the comparisons among the conventional wedge panel, the conventional gapless profile wedge panel and the present invention.

The comparisons among the conventional wedge panel, the conventional gapless profile wedge panel and the present invention are shown in FIG. 8, in which the original image of "Alex" and the displayed images in the conventional sedge panel, the conventional gapless profile sedge panel and the present invention are shown. As may be seen in FIG. 8, it is clear that the image gap distortion is not found in the present invention.

As the present invention has been described in details by illustrating its embodiments, those skilled in the art may realize possible variations and modifications to the embodiments without escaping from the spirit and scope of this invention. The possible variations and modifications may include, but are not limited to:

In the embodiments, the circular curve is selected as the surface curve of the transition waveguide. It may be appreciated that a parabolic curve may also be selected to function as the surface curve to provide even or better effects.

It is also appreciated that the shape of the first waveguide is not limited to any particular shape. Although in the embodiments a slab is used as the first waveguide, it is possible to use a tool in any shape to fan out the projected image.

Although in the embodiment the curve length is selected to be as short as possible, it is understood that any designer may determine the curve length of the transition waveguide by making it longer or shorter, as long as the obtained display image is acceptable.

The image compression distortion towards the top of the prototype panel of the embodiment can be solved by a conventional image processing technique, such as the image processing software. Also, optimising the constraint parameters used in the embodiments can further reduce the compression distortion. It is also possible to use an anti-reflection coating to improve the image brightness and uniformity, as the coating reduces the amount of light wasted into the ghost images generated in the flat panel display device. The anti-reflection coating applicable in this case includes the gradient index coating (GRIN) and the antireflection structured (ARS) surface. Coating the GRIN on top of the waveguide, however, would deform the shape of the waveguide surface due to the thermal energy transferred to the surface of the panel during the annealing processes. Therefore, it is preferably to use a method other than coating or thermal process to fix the GRIN to the surface of the waveguide. The ARS allows one to simply emboss the ARS coating on the wedge waveguide without damaging the waveguide surface.

Using a laser as the light source for a projector can enhance the image brightness and the colour reproduction capability of an existing projection display technology. The laser projection also solves the focus issues with the conventional lamp-lit projection systems. Combining a laser projector, especially the laser pico-projector with a folded flat panel display device designed in accordance with the present invention will generate a small to medium size flat panel display device that has a set-depth.

It is also possible to use a holographic projector in combination with the invented flat panel display device to create a slim, self-contained holographic projection display device. This combination makes it possible to deliver 3-D images over a wedge flat panel display device or to use the holographic technology to remove some of the image distortion issues related to the wedge display technology.

It is also appreciated that the invented flat panel display device may serve as the input lens of an image input device. Therefore, combining the invented flat panel display device with an image input component would create a useful and effective image input device.

The invented flat panel display device is a good candidate for the flexible display device. The flat panel display device is essentially a thin sheet made of plastics or glass without a complex layer structure. Such a nature provides the advantages of being light, thin, rugged, easily formed into different shapes and bendable or rollable. A curved display with a large field of view offers an unmatched immersive viewing experience and an increased peripheral vision. A curved display with up to the 360-degree field of view can be used in a cinema, a casino, on the roof of a stadium and in the gaming industry. There are also applications in the fields of medical, military and engineering industries other than for the purpose of entertainment.

Figure 9:
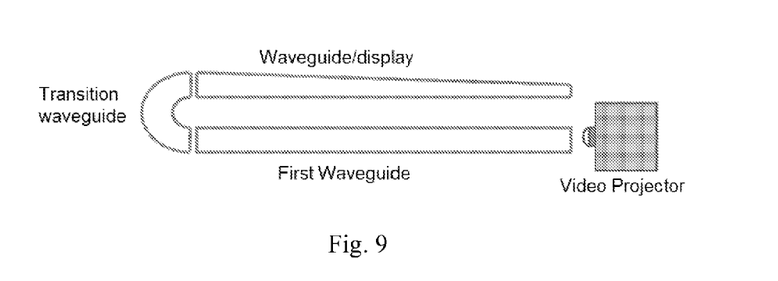
FIG. 9 illustrates a U-shaped flat panel display device according to the present invention.

The invented method to determine the optical profile of the flat panel display device of this invention ensures the linearity of the image pixels/lines in any type of the projective waveguide display. It also enables the flexibility in choosing the shape of the first waveguide and the folding mechanism. Therefore, it is possible to design a folded flat panel display device that has a U shape, wherein the folding mechanism rests in the transition waveguide. A flat panel display device with a flat first waveguide 11, a folded transition waveguide 21 and a flat and substantially edge-shaped waveguide/display panel 31 is shown in FIG. 9.

The above descriptions serve to illustrate the present invention by examples, without limiting the scope of protection in the present invention. The scope of this invention is defined only by the following claims.

What is claimed is:

1. A flat panel display device comprising in order a first waveguide, a transition waveguide and a second waveguide, wherein said second waveguide and display panel has display surface and a substantially wedged shape and a plurality of linearly connected sections, each of the plurality of linearly connected sections having a respective display surface with a tilt angle that decreases with distance from the transition waveguide, the thickness and tilt angle of each respective display surface being arranged such that:

first rays entering the first waveguide at a first angle of incidence pass through the first waveguide and transition waveguide and then exit the flat panel display device at a first exit angle with respect to the respective display surface of a first said linearly connected section of the second waveguide through which the first rays exit, said first linearly connected section being adjacent the transition waveguide, and second to nth rays entering the first waveguide at respective second to nth angles of incidence pass through the first waveguide and transition waveguide and then exit the flat panel display device at second to nth exit angles with respect to the respective display surfaces of second to nth said linearly connected sections of the second waveguide through which the second to nth rays exit, wherein an exit angle of the first rays is substantially the same as an exit angle of each of the second to nth rays to compensate for distortions in the displayed image generated by the light path of incident image rays in said first waveguide and said transition waveguide.

2. The flat panel display device according to claim 1, wherein said first to nth angles of incidence are within a selected range of angles predetermined to respectively enable said first to nth rays to exit said second waveguide and display surface at said substantially the same exit angle, after they have travelled through said first waveguide and said second waveguide.

3. The flat panel display device according to claim 1, wherein said exit angle is smaller than a critical angle of said second waveguide, whereby the exiting rays do not intercept the display surfaces at an angle equal to or shallower than the critical angle.

4. The flat panel display device according to claim 1, wherein said transition waveguide has a curved surface and a length that is short enough to restrict rays entering the transition waveguide from the first waveguide to bounce not more than once in said transition waveguide.

5. The flat panel display device according to claim 1, wherein:
a surface profile of said display surface of the first section most adjacent to said transition waveguide is determined by calculating the optical path of image rays from a light source positioned at the entrance side of said first waveguide with said first incident angle passing through said first waveguide and said transition waveguide to produce a selected range of said exit angles, and
a surface profile of the respective display surface of said nth (where n is a natural number equal or greater than 2) section is determined by calculating optical path of image rays of said light source with said nth incident angle passing through said first waveguide, said transition waveguide and the first to n−1th sections of said second waveguide and display panel to produce said exit angles that are substantially the same.

6. The flat panel display device according to claim 5, wherein said exit angles is smaller than a critical angle of said second waveguide, whereby the exiting rays do not intercept the display surfaces at an angle equal to or shallower than the critical angle.

7. The flat panel display device according to claim 1, wherein said transition waveguide forms a U shape.

8. The flat panel display device according to claim 5, wherein said transition waveguide forms a U shape.

9. The flat panel display device according to claim 1, further comprising a prism positioned at an entrance end of said first waveguide.

10. The flat panel display device according to claim 1, wherein a surface of said transition waveguide forms a circular curve.

11. The flat panel display device according to claim 1, wherein a surface of said transition waveguide forms a parabolic curve.

12. The flat panel display device according to claim 1, further comprising an anti-reflection coating on said display surfaces.

13. The flat panel display device according to claim 12, wherein said anti-reflection coating comprises a gradient index coating (GRIN).

14. The flat panel display device according to claim 12, wherein said anti-reflection coating comprises an antireflection structured (ARS) surface.

15. A method to determine the optical profile of a flat panel display device comprising in order a first waveguide, a transition waveguide and a second waveguide and display panel, wherein said second waveguide and display panel has a substantially wedged shape and a plurality of linearly connected sections, each of the plurality of linearly connected sections having a respective display surface with a tilt angle that decreases with distance from the transition waveguide, the thickness and tilt angle of each respective display surface being determined by the steps of:
determining optical characteristics of said first waveguide and said transition waveguide;
selecting major incident angles of lights, and
calculating to obtain a surface profile of said linearly connected sections in said second waveguide and display panel corresponding respectively to said selected light angles, said surface profile being defined by said thicknesses and tilt angles, so as to equalize exit angles of said lights for selected said major incident angles of said lights, to compensate for distortions in displayed image generated by said selected lights' paths in said first waveguide.

16. The method according to claim 15, wherein said calculation in surface profile of said second waveguide and display panel comprises the steps of:
selecting a first light angle to calculate and obtain a surface profile of a first section in said second waveguide and display panel most adjacent to said transition waveguide, to compensate for distortion in said displayed image generated by said light of said first angle in said first waveguide and said transition waveguide:
selecting an nth (n is a natural number equal to or greater than 2) light angle to calculate and obtain a surface profile of an nth section in said second waveguide and display panel following said first section, to for distortion in said displayed image generated by lights of said nth angle in said first waveguide, said transition waveguide and the first to n−1th section of said second waveguide and display panel; and
repeating the previous step until all selected light angles are calculated.

17. The method according to claim 15, wherein said transition waveguide has a curved surface on one side and a length short enough to restrict the light rays from said first waveguide to a maximum number of bounces in said transition waveguide.

18. The method according to claim 17, wherein said maximum number is 1.

19. The method according to claim 15, wherein said determination of the surface profile of said linearly connected sections of the second waveguide and display panel comprises the steps of:
calculating to obtain a respective surface profile of a first section of said second waveguide and display panel's display surface according to an optical path of image rays from a light source positioned at entrance side of said first waveguide with a first incident angle passing through said first waveguide and said transition waveguide to produce a selected range of exit angles; and
calculating to obtain a respective surface profile of an nth (n is a natural number equal or greater than 2) section of said display surface according optical path of image rays from said light source with an nth incident angle passing through said first waveguide, said transition waveguide and the first to n−1th sections of said second waveguide and display panel to produce said selected range of exit angles.

20. The method according to claim 19, wherein said selected range of exit angles comprise an angle smaller than the critical angle of said second waveguide and display panel, whereby the exit rays do not intercept the display surfaces at an angle equal to or shallower than the critical angle.

21. A method as claimed in claim 15, further comprising the step of
determining surface profile of said first waveguide, said transition waveguide and said second waveguide and display panel according to said optical characteristics of the first waveguide, transition waveguide, second waveguide, and display panel.

22. The method according to claim 21, wherein said selected range of exit angles comprise an angle smaller than the critical angle of said second waveguide and display panel, whereby the exit rays do not intercept the display surfaces at an angle equal to or shallower than the critical angle.

23. The method according to claim 21, wherein said transition waveguide is arranged to allow incoming image rays to bounce not more than once in said transition waveguide.

24. The method according to claim 21, wherein said optical paths are calculated using a trigonometric relationship of said incident image rays and surfaces profile of said first waveguide and said transition waveguide.

25. The method according to claim 21, wherein said second and following incident angles are respectively greater than the incident angle selected in a previous step.

26. The method according to claim 15, wherein said transition waveguide has a curved surface on one side and a length short enough to restrict the light rays from said first waveguide to a maximum number of bounces in said transition waveguide.

27. The method according to claim 26, wherein said maximum number is 1.

28. A method to prepare a flat panel display device comprising in order a first waveguide, a transition waveguide and a second waveguide and display panel, wherein said second waveguide and display panel has a substantially wedged shape and a plurality of linearly connected sections, each of the plurality of linearly connected sections having a respective display surface with a tilt angle that decreases with distance from the transition waveguide, the thickness and tilt angle of each respective display surface being determined by the steps of:
    determining an optical profile of said flat panel display device comprising the substeps of:
    determining optical characteristics of said first waveguide and said transition waveguide;
    selecting major incident angles of lights, and
    calculating to obtain a surface profile of said linearly connected sections in said second waveguide and display panel corresponding respectively to said selected light angles, said surface profile being defined by said thicknesses and tilt angles, so as to equalize exit angles of said lights for selected said major incident angles of said lights, to compensate for distortions in displayed image generated by said selected lights' paths in said first waveguide; and
    preparing said flat panel display device using optical profile information so determined.

29. The method according to claim 28, wherein said selected range of exit angles comprise an angle smaller than the critical angle of said second waveguide and display panel, whereby the exit rays do not intercept the display surfaces at an angle equal to or shallower than the critical angle.

* * * * *